(12) United States Patent
Strasman et al.

(10) Patent No.: US 11,689,772 B2
(45) Date of Patent: *Jun. 27, 2023

(54) RATING VIDEO-DOWNLOAD QUALITY

(71) Applicant: VASONA NETWORKS INC., Austin, TX (US)

(72) Inventors: Nery Strasman, Ramat Gan (IL); Tai Shaul, Tel Aviv (IL)

(73) Assignee: Vasona Networks, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,049

(22) Filed: Jul. 6, 2021

(65) Prior Publication Data

US 2021/0337276 A1     Oct. 28, 2021

Related U.S. Application Data

(63) Continuation of application No. 16/789,112, filed on Feb. 12, 2020, now Pat. No. 11,089,376, which is a
(Continued)

(51) Int. Cl.
*H04L 12/24* (2006.01)
*H04N 21/475* (2011.01)
*H04N 21/442* (2011.01)
*H04L 41/5067* (2022.01)
*H04N 21/24* (2011.01)
*H04W 24/08* (2009.01)

(52) U.S. Cl.
CPC ....... *H04N 21/475* (2013.01); *H04L 41/5067* (2013.01); *H04N 21/2402* (2013.01); *H04N 21/44204* (2013.01); *H04N 21/44209* (2013.01); *H04W 24/08* (2013.01)

(58) Field of Classification Search
CPC ............. H04N 21/475; H04N 21/2402; H04N 21/44209; H04N 21/4756; H04L 41/5067
See application file for complete search history.

(56) References Cited

U.S. PATENT DOCUMENTS

| | | | | |
|---|---|---|---|---|
| 7,929,512 B2 * | 4/2011 | Malomsoky | .......... | H04W 24/08 370/345 |
| 2004/0058652 A1 * | 3/2004 | McGregor | ............ | H04W 24/00 455/67.13 |

(Continued)

OTHER PUBLICATIONS

Notice of Allowance dated Apr. 13, 2021, filed in U.S. Appl. No. 16/789,112, pp. 1-3.

(Continued)

*Primary Examiner* — Nicholas P Celani
*Assistant Examiner* — Wuji Chen

(57) ABSTRACT

Apparatus for rating download events is described. The apparatus includes a network interface and a processor. The processor, via the interface, monitors one or more download events in which content is downloaded by one or more users. In response to the monitoring, the processor identifies at least one quantitative property of the download events. Based on the property, the processor assigns a rating to the download events that is indicative of an estimated user-perceived quality of the download events. The processor then generates an output indicative of the rating. Other embodiments are also described.

12 Claims, 3 Drawing Sheets

Related U.S. Application Data continuation of application No. 14/876,850, filed on Oct. 7, 2015, now Pat. No. 10,582,266.

(56) References Cited

U.S. PATENT DOCUMENTS

| | | | | |
|---|---|---|---|---|
| 2008/0288977 | A1* | 11/2008 | Howcroft | H04N 21/64322 725/37 |
| 2010/0011119 | A1* | 1/2010 | Knowlton | H04L 65/602 709/235 |
| 2011/0096678 | A1* | 4/2011 | Ketonen | H04W 24/06 370/252 |
| 2012/0072267 | A1* | 3/2012 | Gutierrez, Jr. | G06Q 10/063 705/7.39 |
| 2012/0311126 | A1* | 12/2012 | Jadallah | H04N 21/23805 709/224 |
| 2013/0159863 | A1* | 6/2013 | Smith | H04L 41/12 715/734 |
| 2014/0156863 | A1* | 6/2014 | Gao | H04L 65/4084 709/231 |
| 2014/0229614 | A1* | 8/2014 | Aggarwal | H04M 3/2236 709/224 |
| 2015/0026309 | A1* | 1/2015 | Radcliffe | H04L 69/14 709/219 |
| 2015/0146012 | A1* | 5/2015 | Shipley | H04N 17/004 348/177 |
| 2015/0333986 | A1* | 11/2015 | Pang | H04L 43/065 370/252 |
| 2015/0341812 | A1* | 11/2015 | Dion | H04N 21/2404 370/252 |
| 2016/0286428 | A1* | 9/2016 | Fassmer | H04L 67/322 |
| 2017/0070781 | A1* | 3/2017 | Bar Yanai | H04N 21/44008 |

OTHER PUBLICATIONS

Terminal Disclaimer filed on Mar. 23, 2021, filed in U.S. Appl. No. 16/789,112, pp. 1-2.
Terminal Disclaimer filed on Mar. 23, 2021, filed in U.S. Appl. No. 16/789,112, p. 1.
Response to Non-Final Office Action filed on Mar. 22, 2021, filed in U.S. Appl. No. 16/789,112, pp. 1-10.
Non-Final Rejection dated Oct. 20, 2020, filed in U.S. Appl. No. 16/789,112, pp. 1-18.

\* cited by examiner

RATING VIDEO-DOWNLOAD QUALITY

FIELD OF THE INVENTION

Embodiments of the present invention relate generally to video communication, and specifically to rating video-download quality.

BACKGROUND

When downloading video content, users may become frustrated if the download is proceeding slowly, and/or if the quality of the download is otherwise poor.

SUMMARY OF THE INVENTION

There is provided, in accordance with some embodiments of the present invention, apparatus for rating download events. The apparatus includes a network interface and a processor. The processor, via the interface, monitors one or more download events in which content is downloaded by one or more users. In response to the monitoring, the processor identifies at least one quantitative property of the download events. Based on the property, the processor assigns a rating to the download events that is indicative of an estimated user-perceived quality of the download events. The processor then generates an output indicative of the rating.

In some embodiments, the processor is configured to monitor one or more download events in which video content is downloaded by one or more users.

In some embodiments, the property includes a fraction of the download events in which less than a given number of bytes of content was downloaded, the processor being configured to assign the rating based on the fraction.

In some embodiments, the property includes a fraction of the download events in which less than a given duration of content was downloaded, the processor being configured to assign the rating based on the fraction.

In some embodiments, the property includes, for each of the download events, an amount of time required to download a given number of bytes of content, the processor being configured assign the rating based on the respective amounts of time.

In some embodiments, the property includes, for each of the download events, an amount of time required to download a given duration of content, the processor being configured assign the rating based on the respective amounts of time.

In some embodiments, the property includes, for each of the download events, a number of buffer-underflow events, the processor being configured assign the rating based on the respective numbers of buffer-underflow events.

In some embodiments, the property includes, for each of the download events, a buffer-underflow duration, the processor being configured assign the rating based on the respective buffer-underflow durations.

In some embodiments, the processor is configured to use a rating system to assign the rating to the download events, the rating system including (i) a plurality of value ranges, and (ii) a plurality of ratings corresponding, respectively, to the value ranges, by:
ascertaining that the identified property falls within a particular one of the value ranges, and
assigning the rating that corresponds to the particular one of the value ranges.

In some embodiments, the rating system is designated manually by an operator, and the processor is further configured to receive the manually-designated rating system.

In some embodiments, the processor is further configured to designate the rating system.

In some embodiments, wherein the processor is configured to adaptively designate the rating system.

In some embodiments, the processor is configured to designate the rating system by:
via the interface, monitoring a plurality of sample download events,
in response to the monitoring of the sample download events, identifying, for each of the sample download events, a data point that includes (i) the quantitative property, and (ii) a measure of satisfaction of the download event, and
in response to the respective data points, designate the rating system.

In some embodiments, the measure of satisfaction includes, for each of the download events, a percentage of content that was downloaded during the download event, the processor being configured to designate the rating system in response to the respective percentages.

In some embodiments, the processor is further configured to identify a trend in the rating, and, in response to the trend, generate an output.

In some embodiments, the processor is configured to assign the rating based on respective times at which the download events occurred.

In some embodiments, the processor is configured to assign the rating based on respective geographical locations of the users during the download events.

There is further provided, in accordance with some embodiments of the present invention, a method for rating download events. One or more download events in which content is downloaded by one or more users are monitored. In response to the monitoring, at least one quantitative property of the download events is identified. Based on the property, a rating that is indicative of an estimated user-perceived quality of the download events is assigned to the download events. An output indicative of the rating is generated.

In some embodiments, monitoring the download events includes monitoring one or more download events in which video content is downloaded by one or more users.

In some embodiments, monitoring the download events includes monitoring download events in which content is downloaded via a particular group of one or more cells belonging to a cellular network, the rating being indicative of an estimated user-perceived quality of service provided by the group.

In some embodiments, monitoring the download events includes monitoring download events in which content is downloaded via a plurality of groups of cells providing cellular service to respective geographic areas, and assigning the rating includes assigning a respective rating for each one of the groups.

In some embodiments, generating the output includes generating a visual output that shows (i) the geographic areas, and (ii) the respective ratings.

In some embodiments, monitoring the download events includes monitoring download events in which content is downloaded via a particular cellular network, the rating being indicative of an estimated user-perceived quality of service provided by the network.

In some embodiments, monitoring the download events includes monitoring download events in which content is downloaded from a particular content source, the rating being indicative of an estimated user-perceived quality of service provided by the content source.

In some embodiments, monitoring the download events includes monitoring download events in which content is downloaded by a particular user.

In some embodiments, monitoring the download events includes monitoring download events occurring during a particular recurring span of time.

There is further provided, in accordance with some embodiments of the present invention, a computer software product including a tangible non-transitory computer-readable medium in which program instructions are stored. The instructions, when read by a processor, cause the processor to: (i) via a network interface, monitor one or more download events in which content is downloaded by one or more users, (ii) in response to the monitoring, identify at least one quantitative property of the download events, (iii) based on the property, assign a rating to the download events that is indicative of an estimated user-perceived quality of the download events, and (iv) generate an output indicative of the rating.

The present invention will be more fully understood from the following detailed description of embodiments thereof, taken together with the drawings, in which:

DETAILED DESCRIPTION OF EMBODIMENTS

Overview

Figure 1:
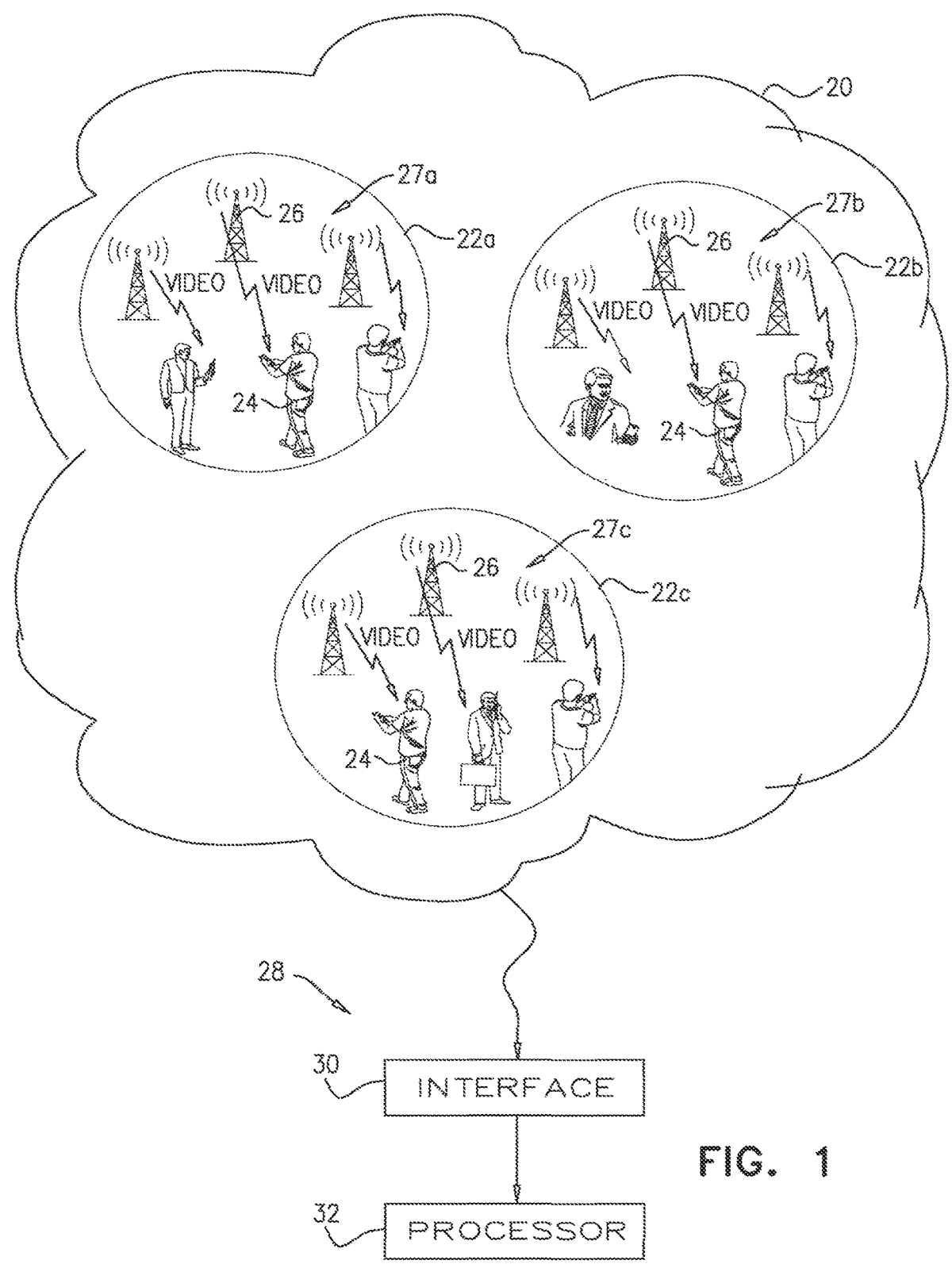
FIG. 1 is a schematic illustration of apparatus for rating video download events, in accordance with some embodiments of the present invention.

The term "download event" refers herein to an event in which content is downloaded by a user, e.g, to a mobile phone. For example, a "video download event," which refers to an event in which video content is downloaded, may begin when the user hits the "play" button on his mobile phone, and may end when the entire video has been downloaded, or when the user terminates the download event before the entire video has been downloaded.

A video download event typically begins with an initial buffering stage, during which the beginning portion (e.g., the first five seconds) of the video is downloaded. Since the user cannot yet view the video during the initial buffering stage, the duration of the initial buffering stage may be referred to as the "start delay," during which the user must wait for the video to start playing. Following the initial buffering stage, the download event proceeds with one or more subsequent buffering stages, during which subsequent portions of the video are downloaded, and during which the user may view previously-downloaded portions of the video.

Embodiments of the present invention provide apparatus and methods for assigning a rating to download events, the rating being indicative of an estimated quality of the download events from the user's perspective. The rating may help a particular cellular network or content source improve the quality of service provided to users.

Some prior-art methods use subjective scores, such as Mean Opinion Scores (MOS), to provide such ratings. However, subjective scores may be relatively unreliable. For example, an individual who is asked to provide a subjective score for his video-download experience may have difficulty translating his experience into an appropriate score, and/or may answer in accordance with what he thinks he "should" be answering, rather than in accordance with his true perception of the download experience. Furthermore, subjective scores depend on users' expectations, which may vary with the time and place of the download experience.

On the other hand, embodiments of the present invention provide a generally objective rating of video download events. To provide the rating, one or more video download events are monitored. In response to the monitoring, at least one quantitative property of the download events is identified. For example, the property may include:

(ii) a fraction of the download events in which less than a given number of bytes of content, or a given duration of content (e.g., a given length of video content), was downloaded, (ii) an average amount of time required to download a given number of bytes of content, or a given duration of content (e.g., a given length of video content), (iii) a number of buffer-underflow events, and/or (iv) an average buffer-underflow duration for the downloads.

Based on the quantitative property, the rating is assigned to the download events.

In general, the rating method provided by embodiments of the present invention has several advantages. For example:

(i) As noted above, the rating provided in accordance with embodiments of the present invention is generally objective, since the quantitative property is an objective property.

(ii) The rating method provided by embodiments of the present invention may account for the different times at which the download events occurred, and/or account for the different geographical locations of the users, thus rendering the rating even more accurate than the rating would otherwise be.

(iii) The rating provided in accordance with embodiments of the present invention may be generated relatively easily, generally on demand (e.g., following the monitoring of a plurality of download events over a few hours or days), fully- or semi-automatically.

(iv) The rating provided in accordance with embodiments of the present invention may be based on a relatively large number (e.g., tens of thousands, hundreds of thousands, or even millions) of download events, such that the rating is likely to be accurate.

Although the present description relates mainly to video content and video download events, it is noted that apparatus and methods described herein may be applied to downloads of any relevant type of content. For example, apparatus and methods described herein may be used to rate downloads of audio content, textual content, or any other relevant type of content. The downloading of such content may be associated with any relevant type of activity, such as browsing, social-media-related activity, or gaming.

System Description

Reference is initially made to FIG. 1, which is a schematic illustration of apparatus 28 for rating video download events, in accordance with some embodiments of the present invention. FIG. 1 depicts a cellular network 20 covering a plurality of geographic areas, three such geographic areas 22a, 22b, and 22c being shown in the figure. In each geographic area, cellular service is provided by a group of one or more cells 26. Thus, FIG. 1 depicts a group 27a of cells providing service in area 22a, a group 27b of cells providing service in area 22b, and a group 27c of cells providing service in area 22c. In each of the geographic areas, users 24 download video content via the group of cells providing service in the geographic area.

Apparatus 28 comprises a network interface 30, and a processor 32. Processor 32 monitors, via interface 30, one or more download events in which video content is downloaded by one or more users 24. In response to the monitoring, the processor identifies at least one quantitative property of the download events, and based on the property, assigns a rating to the download events, the rating being indicative of an estimated user-perceived quality of the download events.

In some embodiments, apparatus 28 monitors download events in which video content is downloaded via a particular group of one or more cells, such that the rating is indicative of an estimated user-perceived quality of service provided by the group. (In other words, effectively, the rating is assigned to the group of cells.) For example, with reference to FIG. 1, apparatus 28 may monitor download events in which video content is downloaded via group 27a of cells, such that the rating assigned to the download events is indicative of an estimated user-perceived quality of service provided by group 27a. Apparatus 28 may also monitor other groups in network 20, and/or groups belonging to other networks, and assign a plurality of respective ratings to the groups. Alternatively or additionally, by monitoring download events in which video content is downloaded via a particular cellular network (e.g., network 20), a rating that is indicative of an estimated user-perceived quality of service provided by the network may be assigned.

Various quantitative properties may be used to assign the ratings, as described in the paragraphs below. To facilitate the description below, reference is made to Table 1 below, which shows some purely illustrative sample data for ten hypothetical monitored download events. (Typically, to assign the rating with a relatively high degree of confidence, the processor monitors many more than ten download events.)

TABLE 1

| Event No. | Length of Video Downloaded | Amount of Time to Download 5 seconds of Video | Number of Buffer Underflows | Total Buffer-Underflow Duration |
|---|---|---|---|---|
| 1 | 7 seconds | 4 seconds | 1 | 4 seconds |
| 2 | 3 minutes | 3 seconds | 2 | 1 second |
| 3 | 2 seconds | N/A | N/A | N/A |
| 4 | 4 seconds | N/A | N/A | N/A |
| 5 | 16 seconds | 4 seconds | 3 | 6 seconds |
| 6 | 2.5 minutes | 4 seconds | 2 | 2 seconds |
| 7 | 8 seconds | 2 seconds | 1 | 1 second |
| 8 | 2 minutes | 3 seconds | 0 | 0 seconds |
| 9 | 4 minutes | 5 seconds | 0 | 0 seconds |
| 10 | 3 seconds | N/A | N/A | N/A |

In some embodiments, the quantitative property includes a fraction (or percentage) of the download events in which less than a given length of video content was downloaded. For example, the given length may be the length of video that is typically downloaded during the initial buffering stage (e.g., approximately five seconds), such that the quantitative property includes the fraction of download events in which the user abandoned the download before watching any portion of the video. (Such an abandonment, as opposed to an abandonment that occurs after part of the video has been watched, may particularly reflect a low user-perceived quality of the download event.) If the fraction of such abandoned download events is relatively high, the user-perceived quality of the video downloads is likely to be relatively low, and hence, the assigned rating will be relatively low. Conversely, if the fraction of such abandoned download events is relatively low, the user-perceived quality of the video downloads is likely to be relatively high, and hence, the assigned rating will be relatively high.

For example, with reference to Table 1, download events 3, 4, and 10 were abandoned before five seconds of video were downloaded, such that the value of the quantitative property is 0.3, or 30%.

To ascertain the length of video that was downloaded during the download event, the processor may multiply the number of downloaded video bits by the bitrate, which may be contained in the video header.

Alternatively or additionally, the quantitative property may include, for each of the download events, an amount of time required to download a given length of video content. For example, the given length of video content may be the length of video that is typically downloaded during the initial buffering stage (e.g., approximately five seconds), such that the quantitative property includes the approximate start delay for each of the downloads. Typically, the processor averages, or takes the median of, the respective amounts of time (e.g., the respective start delays) for all of the download events in which the given length of video content was downloaded. If the average or median amount of time is relatively high, the user-perceived quality of the video downloads is likely to be relatively low, and hence, the assigned rating will be relatively low. Conversely, if the average or median amount of time is relatively low, the user-perceived quality of the video downloads is likely to be relatively high, and hence, the assigned rating will be relatively high.

For example, with reference to Table 1, download events 1-2 and 5-9, in which at least five seconds of video were downloaded, have an average start delay of 3.125 seconds.

Alternatively or additionally, the quantitative property may include, for each of the download events, a number of buffer-underflow events. A buffer-underflow event is an event in which the buffer underflows, such that the user's viewing of the video is interrupted. Typically, the processor averages, or takes the median of, the respective numbers of buffer-underflow events. If the average or median number of buffer-underflow events is relatively high, the user-perceived quality of the video downloads is likely to be relatively low, and hence, the assigned rating will be relatively low. Conversely, if the average or median number of buffer-underflow events is relatively low, the user-perceived quality of the video downloads is likely to be relatively high, and hence, the assigned rating will be relatively high.

For example, with reference to Table 1, download events 1-2 and 5-9 have an average of 1.29 buffer-underflow events. (Download events 3-4 and 10 are not relevant in this regard, since these download events were abandoned before any viewing occurred.)

In some embodiments, the rating is based on a number of buffer-underflow events per second, or another similar "normalized" quantity.

Alternatively or additionally, the quantitative property may include, for each of the download events, a buffer-underflow duration, e.g., the total duration of all buffer-underflow events, or the duration of the longest buffer-underflow event. Typically, the processor averages, or takes the median of, the respective buffer-underflow durations. If the average or median buffer-underflow duration is relatively high, the user-perceived quality of the video downloads is likely to be relatively low, and hence, the assigned rating will be relatively low. Conversely, if the average or median buffer-underflow duration is relatively low, the user-perceived quality of the video downloads is likely to be relatively high, and hence, the assigned rating will be relatively high.

For example, with reference to Table 1, download events 1-2 and 5-9 have an average total buffer-underflow duration of two seconds.

In some embodiments, the processor calculates a plurality of ratings for the download events, each of the ratings being based on a different quantitative property. The processor then combines the ratings into a single combined rating, which the processor assigns to the download events. For example, the processor may average, take the median of, or take the minimum of, the plurality of ratings.

Some download events may occur via more than one group. For example, the user may move from one geographical area to another while downloading a video, such that the download is "handed over" from one group to another. Such events may "contribute" to the rating of more than one group. For example, if the initial buffering occurs via a first group, while subsequent downloading occurs via a second group, the duration of the initial buffering may be used to assign a rating to the first group, while the number of buffer-underflow events may be used to assign a rating to the second group.

Figure 2:
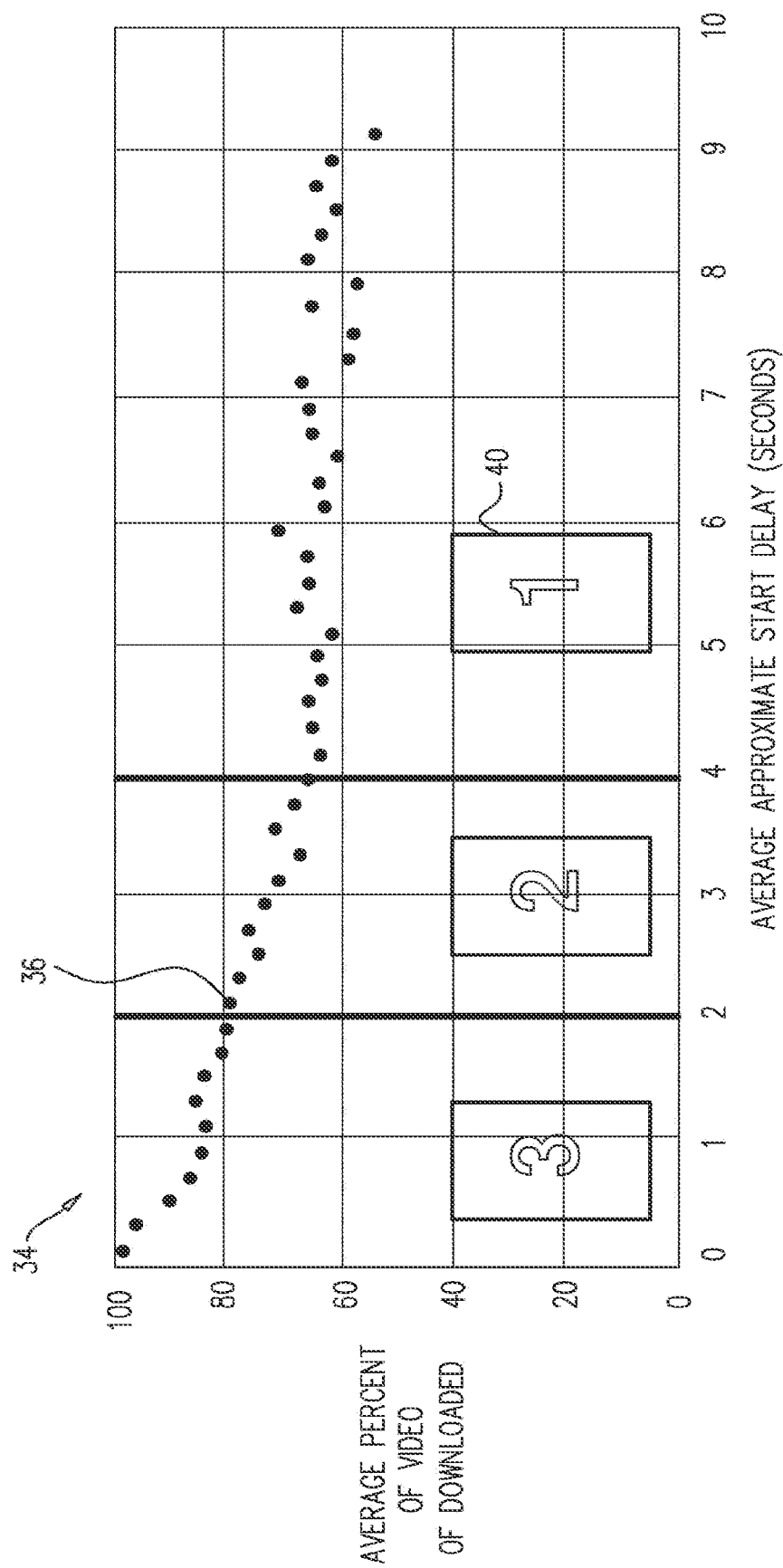
FIG. 2 shows an illustrative rating system, along with the underlying data that was used to designate the rating system, in accordance with some embodiments of the present invention.

Reference is now made to FIG. 2, which shows an illustrative rating system 34, along with the underlying data that was used to designate rating system 34, in accordance with some embodiments of the present invention. The underlying data was acquired by analyzing tens of thousands of video download events in which video content was downloaded via a European network.

The quantitative property upon which rating system 34 is based is the approximate start delay, which, as noted above, is amount of time required to download the length of video that is typically downloaded during the initial buffering stage. For example, the approximate start delay may be the amount of time required to download five seconds of video.

The processor typically uses a rating system such as rating system 34 to assign a rating 40 to the download events. Typically, the rating system includes (i) a plurality of value ranges, and (ii) a plurality of ratings corresponding, respectively, to the value ranges. For example, rating system 34 includes three value ranges, and three corresponding ratings:

(a) For approximate start delays that are in the range of 0-2 seconds, rating system 34 assigns a rating of "3," which indicates the highest estimated level of user-perceived quality.

(b) For approximate start delays that are in the range of 2-4 seconds, rating system 34 assigns a rating of "2."

(c) For approximate start delays that are greater than 4 seconds, rating system 34 assigns a rating of "1," which indicates the lowest estimated level of user-perceived quality.

The boundaries between the ranges are depicted in FIG. 2 as vertical lines superimposed on the graph.

To assign a rating to the download events, the processor ascertains that the identified quantitative property falls within a particular one of the ranges, and assigns the rating that corresponds to the particular one of the ranges. For example, using rating system 34, if the download events have an average approximate start delay of 3 seconds, the download events are assigned a rating of "2."

Typically, processor 32 designates the rating system by monitoring, via interface 30, a plurality of sample download events in which video content is downloaded. For each of the monitored sample download events, the processor identifies a data point that includes (i) the quantitative property (e.g., the approximate start delay), and (ii) a measure of satisfaction of the download event, i.e., a measure that is likely indicative of the degree to which the user was satisfied with the download event. In response to the respective data points, the processor designates the rating system. This will now be described in more detail, with reference to FIG. 2.

FIG. 2 shows a collection of data points, each of the data points representing an average over one or more monitored sample download events. Each data point has two coordinates: a "quantitative property" coordinate, and a "measure of satisfaction" coordinate. The quantitative property, in FIG. 2, is the approximate start delay (as described above), while the measure of satisfaction is the percentage of the video that was downloaded during the download event. (For example, data point 36 corresponds to one or more download events for which the average approximate start delay was slightly greater than two seconds, and during which, on average, around 80% of the video was downloaded.) The percentage of the video that was downloaded is considered to be a measure of satisfaction, in that (i) if a relatively large percentage of the video was downloaded, the user is likely to have been relatively satisfied with the download, and conversely, (ii) if a relatively small percentage of the video was downloaded, the user is likely to have been relatively unsatisfied with the download.

As noted above, in response to the respective data points, the processor designates the rating system. Thus, for example, rating system 34 may be designated in response to the data points shown in FIG. 2, as follows:

(i) The data points show that for approximate start delays greater than four seconds, the degree of user satisfaction is generally not dependent on the approximate start delay. In other words, on average, users downloaded only around 55%-65% of the video during the download event, irrespective of whether the approximate start delay was four seconds, eight seconds, or more. Thus, the boundary for the lowest-rating range may be set at four seconds, such that approximate start delays greater than four seconds will have a corresponding rating of "1."

(ii) For approximate start delays that are less than four seconds, the data points show an approximate linear relationship between the measure of satisfaction and the quantitative property. Thus, the range of 0-4 seconds may be divided into equally-sized smaller ranges, by setting a boundary between the highest-rating range and the middle-rating range at two seconds.

Were the ranges set without reference to the measure of satisfaction, the ratings assigned by the processor would not necessarily be indicative of the user-perceived quality of video downloads (i.e., the degree of user satisfaction). For example, if the boundary between the "1" rating and the "2" rating were (arbitrarily) placed at six seconds instead of at four seconds, a set of download events having an average approximate start delay of five seconds would receive a higher rating than a set of download events having an average approximate start delay of seven seconds. However, the data in FIG. 2 shows that a download having an approximate start delay of five seconds is typically no more "satisfactory" than a download having an approximate start delay of seven seconds. Hence, using the measure of satisfaction to designate the rating system helps the ratings be more indicative of the user-perceived quality of video downloads (i.e., the degree of user satisfaction) than would otherwise be the case.

In some embodiments, the processor designates the rating system adaptively, i.e., the processor occasionally (e.g., periodically, or upon every accumulation of a certain number of new data points) modifies the rating system as it monitors more download events (and hence, acquires more data points).

In some embodiments, the processor does not designate the rating system. Rather, the rating system is designated manually by an operator, or automatically by a separate system, and subsequently provided to the processor.

For simplicity, the ratings system shown and described herein includes relatively few value ranges and corresponding ratings. In practice, the rating system may include many more value ranges and corresponding ratings.

Figure 3:
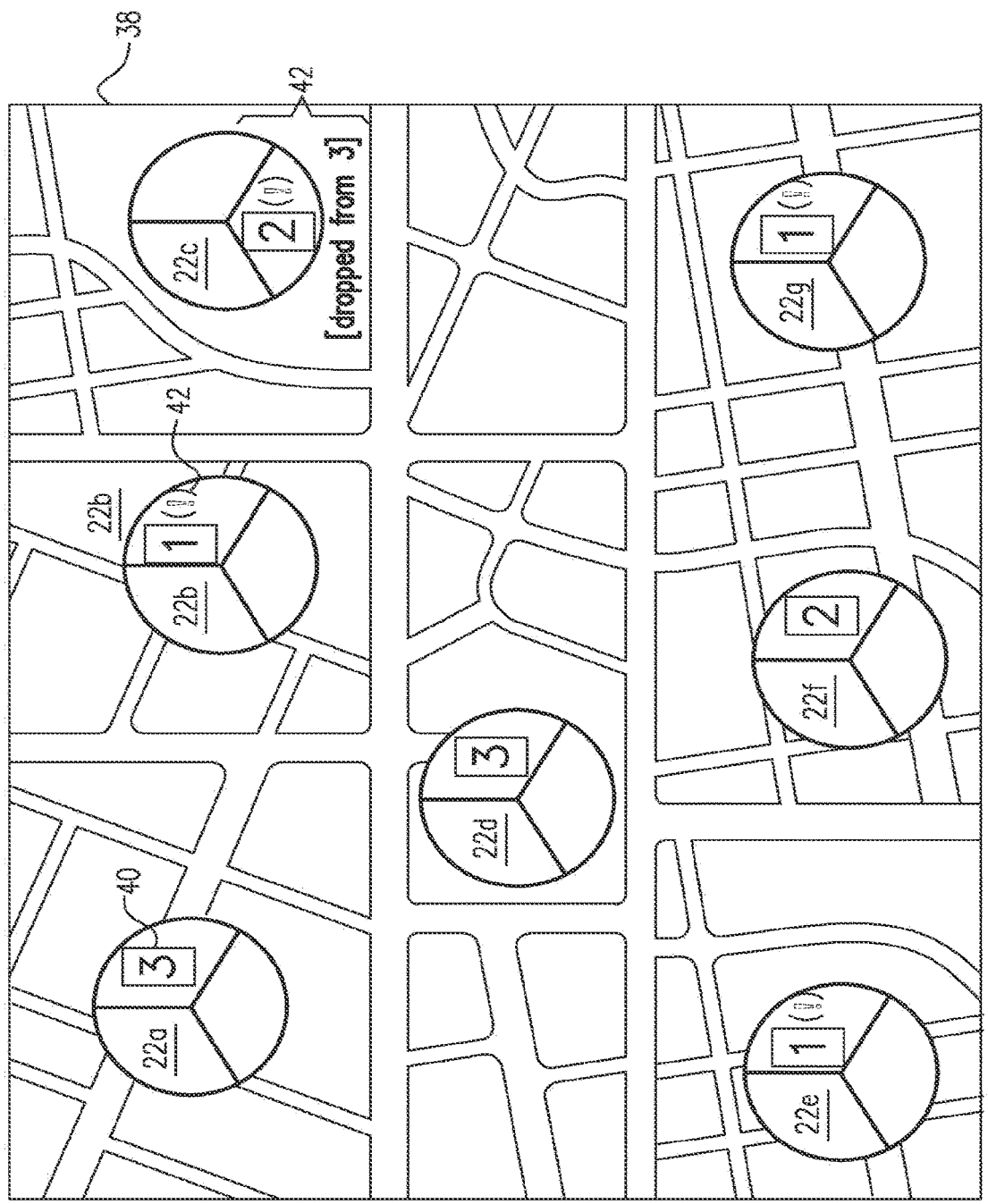
FIG. 3 is a schematic illustration of a visual output, in accordance with some embodiments of the present invention.

Reference is now made to FIG. 3, which is a schematic illustration of a visual output 38, in accordance with some embodiments of the present invention.

As described above with reference to FIG. 1, apparatus 28 may monitor download events in which video content is downloaded via a plurality of groups of cells providing cellular service to respective geographic areas, and, in response thereto, may assign a respective rating to each one of the groups. Processor 32 may then generate a visual output 38 that is indicative of the respective ratings 40 of the groups of cells. For example, as shown in FIG. 3, visual output 38 may include a street map in which the geographic areas are shown. (Each circle in FIG. 3 depicts a geographic area that is covered by a respective group of cells, where each section of the circle depicts the area covered by a particular cell in the group.) Visual output 38 may further show the respective ratings for the plurality of groups, e.g., by overlaying the ratings on the map.

In some embodiments, the processor may generate an output 42 that indicates that a particular rating is relatively poor, and/or indicates a trend in the rating. For example, FIG. 3 shows an example in which:

(i) for all lowest-level ratings of "1," output 42 includes a "(!)" sign to warn the viewer of the output that action may be required to improve the performance of the group of cells; and (ii) for area 22c, in response to identifying a trend in the rating, in that the rating dropped from a "3" to a "2," output 42 includes a "(!)" sign and a message that indicates the worsening trend.

By identifying the trend in the rating of a particular group, the processor may help prevent further worsening of performance of the group. For example, upon viewing output 42 for area 22c, a network supervisor may improve the performance of the group that services area 22c, before the rating for the group further decreases to a "1."

In general, the processor may generate any suitable type of output indicative of the assigned rating. For example, the processor may generate an audio output, alternatively or additionally to a visual output such as visual output 38.

The inventors have observed that, typically, the user-perceived quality of a video download depends on the time and place of the download. For example, users typically expect the start delay during normal sleeping hours to be shorter than during normal waking hours. Thus, for example, whereas a user may download 80% of a video if a particular start delay is experienced during normal waking hours, the user might download only 65% of the video if the same start delay is experienced during normal sleeping hours. Similarly, users typically expect the start delay in urban areas to be different from the start delay in rural areas.

Further to the above observation, the processor may assign the rating to the download events based on respective times at which the download events occurred, and/or based on the respective geographical locations of the users during the download events. For example:

(i) The processor may divide the download events into different subsets, based on the respective times at which the events took place. For example, the processor may divide the download events into a normal-sleeping-hours subset and a normal-waking-hours subset. The processor may then assign a separate rating to each of the subsets. Thus, for example, a particular group of cells may receive a rating of "2" for normal sleeping hours, but only a rating of "1" for normal waking hours, if the added network traffic during normal waking hours overwhelms the group. Similarly, a particular group may receive a first rating for weekdays, and a different, second rating for weekends. (In general, embodiments described herein allow for monitoring, and assigning a rating to, download events occurring during any particular recurring span of time.)

(ii) The processor may "normalize the data" to account for the different times at which the download events occurred. For example, if most of the download events occurred during normal waking hours, any download events that occurred during normal sleeping hours may be "converted" to normal-waking-hours download events, prior to assigning the rating. Thus, for example, a normal-sleeping-hours download event having an approximate start delay of two seconds may be converted to a normal-waking-hours download event having an approximate start delay of three seconds. Such a conversion may be performed, for example, in response to observing that the measure of satisfaction for a normal-sleeping-hours download event having an approximate start delay of two seconds is approximately equal to the measure of satisfaction for a normal-waking-hours download event having an approximate start delay of three seconds.

(iii) The processor may normalize the ratings to account for different types of geographic areas. For example, the processor may assign (a) a first rating to a first group of cells located in an urban area, in response to the group having a particular average approximate start delay, but (b) a second, different rating to a second group of cells located in a rural area, even if the second group has the same average approximate start delay as the first group. This facilitates a "fair" comparison between the first group and the second group.

In some embodiments, a single rating is assigned to a group of cells, or to a network, by taking a weighted average of the separate ratings that were assigned for different recurring spans of time, or for different geographies.

In some embodiments, apparatus 28 monitors download events in which video content is downloaded from a particular content source (e.g., "www.youtube.com"), such that the rating assigned to the download events is indicative of an estimated user-perceived quality of service provided by the content source.

In some embodiments, apparatus 28 monitors download events in which video content is downloaded by a particular user. For example, if a particular user complains to the user's cellular network that the quality of service provided to the user is poor, the cellular network may use apparatus 28 to assign a rating to the user's download events, and then compare the assigned rating with the rating assigned to the network at large.

In general, processor 32 may be embodied as a single processor, or a cooperatively networked or clustered set of processors. Processor 32 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for rating download events, the apparatus comprising: a network interface having nodes to couple to a cellular network covering multiple geographic areas, and each geographic area includes multiple groups of cells providing data service to multiple user devices; and
   a processor; and
   a memory, coupled to the processor, storing code, wherein when executed by the processor, the code causes the processor to perform operations comprising: via the network interface, monitor multiple first download events during multiple times and provided by the multiple groups of cells of the cellular network to the multiple user devices,
   identify first data in the monitored transmission events that includes, for a plurality of the data transmission events: downloaded an objective measure of user satisfaction with the first download event, wherein the measure of user satisfaction includes a percentage of video downloaded during the download event; and
   a set of properties of the first download event, the set of properties including at least one quantitative property and at least one other property selected from the group of properties consisting of a time of the first download event, and a location of a cell via which the first download event is performed;
   normalize the data to account for different times at which the transmission events occur;
   based on the first data, identify a correspondence between the measure of user satisfaction and the set of properties, based on the correspondence, designate a rating system that (i) includes multiple ratings corresponding to different respective ranges of the measure of satisfaction and (ii) returns one of the ratings for each particular transmission event, based on the set of properties of the particular transmission event;
   via the network interface, monitor a plurality of second transmission events in which content is downloaded, by a plurality of users, via one or more groups of one or more cells belonging to the cellular network;
   in response to the monitoring, identify second data that include, for each of the second transmission events, the set of properties of the transmission event, normalize the ratings based on geographic area;
   by applying the rating system to the second data, assign, to the groups of cells, respective ones of the normalized ratings; and
   generate an output indicative of the respective ones of the ratings.

2. The apparatus according to claim 1, wherein the groups of cells provide cellular service to respective geographic areas, and wherein generating the output comprises generating visual output that shows (ii) the geographic areas, and (ii) the respective ones of the ratings.

3. The apparatus according to claim 1, wherein execution of the code further causes the processor to: apply the rating system to the second data to assign one of the ratings to the cellular network.

4. The apparatus according to claim 1, wherein execution of the code further causes the processor to: apply the rating system to the second data to assign one of the ratings to a particular content source from which at least some of the content is downloaded.

5. The apparatus according to claim 1, wherein the quantitative property includes, for any given download event, an amount of time required to download a given number of bytes of content.

6. The apparatus according to claim 1, wherein the quantitative property includes, for any given download event, an amount of time required to download a given duration of content.

7. The apparatus according to claim 1, wherein the quantitative property includes, for the any given download event, a number of buffer underflow events.

8. The apparatus according to claim 1, wherein the quantitative property includes, for any given download event, a buffer-underflow duration.

9. The apparatus according to claim 1, wherein the measure of satisfaction includes, for any given download event, a percentage of content that was downloaded during the given download event.

10. The apparatus according to claim 1, wherein execution of the code further causes the processor to: identify a trend in the rating assigned to at least one of the groups of cells, and wherein the output further indicates the trend.

11. The apparatus according to claim 1, wherein the data transmission event comprises a data download event.

12. The apparatus according to claim 1, wherein the data transmission event comprises a video data download event.

* * * * *